United States Patent Office 2,888,466
Patented May 26, 1959

2,888,466
NEW SERIES OF ORGANIC COMPOUNDS

Joseph Nichols, Princeton, and Edgar S. Schipper, Highland Park, N.J., assignors to Ethicon, Inc., a corporation of New Jersey No Drawing. Application April 22, 1958
Serial No. 730,052

11 Claims. (Cl. 260—348)

This is a continuation-in-part of our copending applications Serial No. 506,351, filed May 5, 1955, and Serial No. 506,352, filed May 5, 1955, both now abandoned.

This invention relates to a new series of organic compounds. More particularly, the present invention is concerned with amides of N-dialkylaminoalkyl-12-ketoelaidic acid, N-dialkylaminoalkyl-12-ketooleic acid, N-dialkylaminoalkyl-12-keto-10,11-octadecenoic acid, N-dialkylaminoalkyl-12-keto-10,11-epoxystearic acid, and N-dialkylaminoalkyl-12-keto-10,11-dihydroxystearic acid.

Geometrically isomeric ricinoleic acid and ricinelaidic acid, having the structural formula

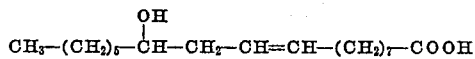

may be oxidized with chromic acid or with an aluminum secondary or tertiary alkoxide to provide geometrically isomeric 12-ketooleic acid and 12-ketoelaidic acid having the structural formula

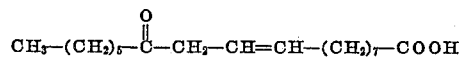

United States Patent No. 2,623,888, issued December 30, 1952, discloses the preparation of 12-keto-10,11-octadecenoic acid by the isomerization of 12-ketooleic acid or 12-ketoelaidic acid. 12-keto-10,11-epoxystearic acid and 12-keto-10,11-dihydroxystearic acid may be prepared by the oxidation of 12-keto-10,11-octadecenoic acid with hydrogen peroxide. Oxidation with hydrogen peroxide leading to the production of 12-keto-10,11-epoxystearic acid is conducted in an alkaline medium at a low temperature and is preferably conducted at a temperature not above —5° C. in the presence of magnesium chloride, which acts as a catalyst. Oxidation with hydrogen peroxide leading to the production of 10,11-dihydroxy-12-ketostearic acid is conducted in solution in anhydrous tertiary butyl alcohol or in solution in anhydrous ether in the presence of a catalytic amount of osmium tetroxide, and preferably at a temperature not exceeding 50° C.

The novel N-dialkylaminoalkyl-12-ketoelaidic acid amides; N-dialkylaminoalkyl-12-ketooleic acid amides; N-dialkylaminoalkyl-12-keto-10,11-octadecenoic acid amides; N-dialkylaminoalkyl-12-keto-10,11-epoxystearic acid amides, and N-dialkylaminoalkyl-12-keto-10,11-dihydroxystearic acid amides of this invention may be prepared by reacting equi-molar amounts of the acid and a lower alkyl chloroformate such as isobutylchloroformate, ethylchloroformate, or propylchloroformate in the presence of an equi-molar amount of a lower aliphatic tertiary amine, an acylalkylcarbonate being the result of the reaction. The reaction is conducted at a temperature below 0° C. and in the presence of an inert solvent such as tetrahydrofuran or toluene. The addition of an amine to the reaction mixture containing the acylalkylcarbonate results in the formation of the desired amide.

The novel amides of this invention have the following general structure:

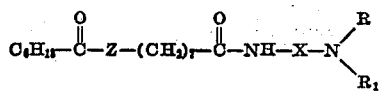

wherein Z is:

$CH_2$—$CH$=$CH$ $CH$=$CH$—$CH_2$

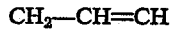

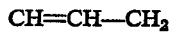

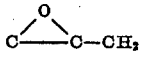

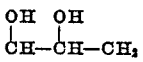

X is a lower alkylene straight or branched-chain radical and preferably having two or three carbon atoms, and R and $R_1$ are each a lower alkyl radical and preferably a methyl or ethyl radical.

For the purpose of illustration, the following examples are set forth to illustrate the prepartion of the novel compounds of the invention but are not to be construed as limiting the spirit of the invention or its scope.

EXAMPLE I

*N-beta-diethylaminoethyl-12-ketoelaidamide*

2.74 grams of isobutylchloroformate were added dropwise to a stirred solution of 5.92 grams of 12-ketoelaidic acid and 2.04 grams of triethylamine in solution in 200 ml. of tetrahydrofuran, the temperature during the addition being maintained at —5° C. to —10° C. The reaction mixture was maintained at the same temperature and stirring continued for thirty minutes after addition was completed. 2.32 grams of diethylaminoethylamine were rapidly added to the reaction mixture and the reaction mixture was then refluxed for 30 minutes. The triethylamine hydrochloride formed was removed by filtration and the filtrate was evaporated to dryness under reduced pressure. The residue was dissolved in 300 ml. of thrice normal hydrochloric acid and the solution was decolorized with animal charcoal and filtered. The filtrate was neutralized with a concentrated solution of potassium hydroxide and the oily layer formed on neutralization was extracted with 200 ml. of ether. The ether solution was dried over sodium sulfate, filtered, and the ether was removed under reduced pressure until the total volume was 20 ml... Twenty ml. of petroleum ether having a boiling point of 30° C. to 60° C. were added and the solution was cooled to 0° C. The crystalline material formed upon cooling the petroleum ether solution, was recrystallized from an ether-petroleum ether mixture and two grams of N-beta-diethylaminoethyl-12-ketoelaidamide having a melting point of 52 to 53° C. were obtained.

Calculated for $C_{24}H_{46}O_2N_2$:

| | Percent |
|---|---|
| Carbon | 73.04 |
| Hydrogen | 11.75 |

Found:

| | |
|---|---|
| Carbon | 73.43 |
| Hydrogen | 11.95 |

EXAMPLE II

N-beta-dimethylaminoethyl-12-ketoelaidamide 2.74 grams of isobutylchloroformate were added dropwise to a stirred solution of 5.92 grams of 12-ketoelaidic acid and 2.04 grams of triethylamine in solution in 200 ml. of tetrahydrofuran, the reaction mixture being maintained at —5 to —10° C. during the addition by means of an alcohol-Dry Ice bath. The reaction mixture was stirred and maintained at —5 to —10° C. for thirty minutes after addition had been completed. 1.76 grams of dimethylaminoethylamine were added to the reaction mixture and the reaction mixture was refluxed for thirty minutes. A precipitate of triethylamine hydrochloride was formed and removed by filtration and the filtrate was evaporated to dryness under reduced pressure. The residue was dissolved in 300 ml. of thrice normal hydrochloric acid and the solution was decolorized with animal charcoal and filtered. The filtrate was neutralized with a concentrated solution of potassium hydroxide and the precipitate which was formed was removed by filtration, dried, and recrystallized three times from ether. 3.4 grams of N-beta-dimethylaminoethyl-12-ketoelaidamide having a melting point of 68–69° C. were obtained.

Calculated for $C_{22}H_{42}O_2N_2$:

| | Percent |
|---|---|
| Carbon | 72.08 |
| Hydrogen | 11.55 |

Found:

| | |
|---|---|
| Carbon | 72.11 |
| Hydrogen | 11.69 |

EXAMPLE III

N-gamma-diethylaminopropyl-12-ketoelaidamide 2.74 grams of isobutylchloroformate were added dropwise to a stirred solution of 5.92 grams of 12-ketoelaidic acid and 2.04 grams of triethylamine in solution in 200 ml. of tetrahydrofuran, the reaction mixture being maintained at —5 to —10° C. during the addition by means of an alcohol-Dry Ice bath. The reaction mixture was stirred and maintained at —5 to —10° C. for thirty minutes after addition had been completed. 2.6 grams of gamma-diethylaminopropylamine were added to the reaction mixture, and the reaction mixture was refluxed for thirty minutes. The precipitated triethylamine hydrochloride which was formed was removed by filtration and the filtrate was evaporated to dryness under reduced pressure. The residue was dissolved in 300 ml. of thrice normal hydrochloric acid and the solution was decolorized with animal charcoal and filtered. The filtrate was neutralized with a concentrated solution of potassium hydroxide and the precipitate formed was removed by filtration, dried, and recrystallized three times from an ether-petroleum ether mixture, the petroleum ether having a boiling point of 30–60° C. Six grams of N-gamma-diethylaminopropyl-12-ketoelaidamide having a melting point of 48–49° C. were obtained.

Calculated for $C_{25}H_{48}O_2N_2$:

| | Percent |
|---|---|
| Carbon | 73.47 |
| Hydrogen | 11.84 |

Found:

| | |
|---|---|
| Carbon | 73.22 |
| Hydrogen | 11.80 |

EXAMPLE IV

N-gamma-dimethylaminopropyl-12-ketooleamide 2.74 grams of isobutylchloroformate were added dropwise to a stirred solution of 5.92 grams of 12-ketooleic acid and 2.04 grams of triethylamine in solution in 200 ml. of dry toluene, the reaction mixture being maintained during the course of addition at —5° C. to —10° C. After addition was completed the reaction mixture was stirred for thirty minutes while it was maintained at a temperature of —5° C. to —10° C. 2.04 grams of gamma-dimethylaminopropylamine were added to the reaction mixture and the reaction mixture was refluxed for thirty minutes. The triethylamine hydrochloride precipitated during the refluxing, was removed by filtration and the filtrate was evaporated to dryness under reduced pressure. The residue obtained by the evaporation was dissolved in 300 ml. of thrice normal hydrochloric acid and the solution was decolorized with animal charcoal and filtered. The filtrate was neutralized with a concentrated solution of potassium hydroxide and the oily layer formed upon neutralization was extracted with 200 ml. of ether. The ether solution was dried over sulfate, filtered, and concentrated to a volume of 20 ml. under reduced pressure and cooled to —20° C. The precipitate which formed upon cooling to —20° C. was collected and recrystallized from ether. 4.6 grams of N-gamma-dimethylaminopropyl-12-ketooleamide having a melting point of 46–47° C. were obtained.

Calculated for $C_{23}H_{44}O_2N_2$:

| | Percent |
|---|---|
| Carbon | 72.58 |
| Hydrogen | 11.65 |

Found:

| | |
|---|---|
| Carbon | 72.31 |
| Hydrogen | 11.65 |

EXAMPLE V

N-beta-dimethylaminoethyl-12-ketooleamide 2.74 grams of isobutylchloroformate were added dropwise to a stirred solution of 5.92 grams of 12-ketooleic acid and 2.04 grams of triethylamine in solution in 200 ml. of dry toluene, the reaction mixture being maintained during the course of the addition at —5° C. to —10° C. After addition was completed the reaction mixture was stirred for thirty minutes while it was maintained at a temperature of —5° C. to —10° C. 1.76 grams of dimethylaminoethylamine were added and the reaction mixture was refluxed for thirty minutes. The precipitated triethylamine hydrochloride formed was removed by filtration and the filtrate was evaporated to dryness under reduced pressure. The residue obtained upon evaporation was dissolved in 300 ml. of thrice normal hydrochloric acid and the solution was decolorized with animal charcoal and filtered. The filtrate was neutralized with a concentrated solution of potassium hydroxide and the oily layer formed was extracted with 200 ml. of ether. The ether solution was dried over sodium sulfate, filtered, and the ether was removed under reduced pressure. The residue was dissolved in petroleum ether having a boiling point of 30–60° C. and the solution was cooled to —20° C. 5.4 grams of N-beta-dimethylaminoethyl-12-ketooleamide were obtained in crystalline form from the cooled petroleum ether solution and had a melting point of 39–40° C.

Calculated for $C_{22}H_{42}O_2N_2$:

| | Percent |
|---|---|
| Carbon | 72.08 |
| Hydrogen | 11.55 |

Found:

| | |
|---|---|
| Carbon | 71.92 |
| Hydrogen | 11.44 |

The novel compounds of this invention are highly effective at low concentration in killing microorganisms or preventing or inhibiting their growth.

EXAMPLE VI

N-beta-dimethylaminoethyl-12-keto-10,11-octadecenoamide 2.74 grams of isobutylchloroformate were added dropwise to a stirred solution of 5.92 grams of 12-keto-10,11-octadecenoic acid and 2.04 grams of triethylamine in solution in 200 ml. of dry toluene, the reaction mixture being maintained at −5 to −10° C. during the addition by means of an alcohol-Dry Ice bath. The reaction mixture was stirred and maintained at −5 to −10° C. for thirty minutes after addition had been completed and 1.76 grams of dimethylamino-ethylamine were then added. The reaction mixture was refluxed for fifteen minutes and the precipitate of triethylamine hydrochloride which was formed was removed by filtration. The filtrate was evaporated to dryness under reduced pressure and the residue was dissolved in 300 ml. of thrice normal hydrochloric acid. The solution was decolorized with animal charcoal and filtered and the filtrate was neutralized with a concentrated aqueous solution of potassium hydroxide. The oily layer formed on neutralization was removed by extraction with 200 ml. of ether. The ether solution which had been dried over sodium sulfate and filtered, was concentrated to a volume of 30 ml., and cooled to −20° C. The precipitate was collected and recrystallized from ether. 3.4 grams of N-beta-dimethylaminoethyl-12-keto-10,11-octadecenoamide having a melting point of 49–50° C. were obtained.

Calculated for $C_{22}H_{42}O_2N_2$:                Percent
  Carbon _____ 72.08
  Hydrogen _____ 11.55

Found:
  Carbon _____ 72.29
  Hydrogen _____ 11.68

EXAMPLE VII

N-gamma-dimethylaminopropyl-12-keto-10,11-epoxystearamide 12-keto-10,11-epoxystearic acid was prepared as follows:

A solution of 38 grams of potassium hydroxide in 166 ml. of water and 420 ml. of methanol and a solution of 174 ml. of 30 percent hydrogen peroxide were added simultaneously over a period of one-quarter hour to a stirred solution of 100 grams of 12-keto-10,11-octadecenoic acid, 19 grams of potassium hydroxide, and four grams of magnesium chloride in eight liters of methanol. The temperature of the reaction mixture was kept at −5° C. during the addition. After the addition was complete, the reaction mixture was stirred at room temperature for one and one-half hours and then maintained at 0° C. for two days. The solution was acidified with ten liters of 0.10-normal hydrochloric acid and sufficient water was added to bring the volume to 40 liters. The precipitate which formed was removed from the reaction mixture, washed with water and recrystallized from 90 percent ethanol. 74 grams of 12-keto-10,11-epoxystearic acid having a melting point of 69.5° C. to 70° C. were obtained.

1.37 grams of isobutylchloroformate were added dropwise to a stirred solution of 3.12 grams of 12-keto-10,11-epoxystearic acid and 1.02 grams of triethylamine in solution in 100 ml. of dry toluene, the reaction mixture being maintained at −5 to −10° C. during the addition by means of an alcohol-Dry Ice bath. The reaction mixture was stirred and maintained at −5 to −10° C. for thirty minutes after addition had been completed and 1.02 grams of gamma-dimethylaminopropylamine were added. The reaction mixture was refluxed for fifteen minutes and the precipitate of triethylamine hydrochloride which was formed was removed by filtration. The filtrate was evaporated to dryness under reduced pressure and the residue was dissolved in 200 ml. of thrice normal hydrochloric acid. The solution was decolorized with animal charcoal and filtered. The filtrate was neutralized with a concentrated aqueous solution of potassium hydroxide and the oily layer formed on neutralization was extracted with 100 ml. of ether. The ether solution which had been dried over sodium sulfate and filtered was concentrated to a volume of 20 ml. and cooled to −20° C. The precipitate was collected and recrystallized from ether. 1.6 grams of N-gamma-dimethylaminopropyl-12-keto-10,11-epoxystearamide, having a melting point of 53–55° C., were obtained.

Calculated for $C_{23}H_{44}O_3N_2$:                Percent
  Carbon _____ 69.65
  Hydrogen _____ 11.18

Found:
  Carbon _____ 69.77
  Hydrogen _____ 11.24

EXAMPLE VIII

N-beta-dimethylaminoethyl-12-keto-10,11-dihydroxystearamide 12-keto-10,11-dihydroxystearic acid was prepared as follows:

75 milliliters of 90 percent hydrogen peroxide and 150 milliliters of a one percent ethereal osmium tetroxide solution were successively added to a stirred solution of 150 grams of 12-keto-10,11-octadecenoic acid in solution in three liters of absolute ether. The reaction mixture was maintained at a temperature of 15–20° C. during the addition and after the addition was complete, stirring of the reaction mixture continued for 15 minutes. The reaction mixture was then maintained at 0° C. for twelve hours, during which time the precipitate was formed. The precipitate was removed from the solution, and the filtrate was diluted with twelve liters of petroleum ether (boiling point 30 to 60° C.) and the solution was cooled to −20° C. A white precipitate was formed, removed by filtration and added to the original precipitate. The combined precipitates were suspended in one liter of water and stirred for one hour, the water was removed and the solid was dissolved in 500 cc. of hot 95 percent ethyl alcohol and decolorized with animal charcoal. Sufficient water was added to the solution to bring the concentration of alcohol therein to 40 percent. The precipitate formed by the addition of water to the alcohol solution was removed, dried, and recrystallized from a mixture of petroleum ether (boiling point 30 to 60° C.) and ether, the proportion of petroleum ether to ether by volume being 4 to 1. 39 grams of 12-keto-10,11-dihydroxystearic acid, having a melting point of 99 to 100° C. were obtained.

1.37 grams of isobutylchloroformate were added dropwise to a stirred solution of 3.3 grams of 12-keto-10,11-dihydroxystearic acid and 1.02 grams of triethylamine in solution in 100 ml. of tetrahydrofuran, the reaction mixture being maintained at −5 to −10° C. during the addition by means of an alcohol-Dry Ice bath. The reaction mixture was stirred and maintained at −5 to −10° C. for thirty minutes after addition had been completed. 0.88 gram of a hot solution of dimethylaminoethylamine in 50 ml. of tetrahydrofuran was added to the reaction mixture and the reaction mixture was refluxed for fifteen minutes. A precipitate of triethylamine hydrochloride was formed and removed by filtration and the filtrate was evaporated to dryness under reduced pressure. The residue was dissolved in 200 ml. of thrice normal hydrochloric acid and the solution was decolorized with animal charcoal and filtered. The filtrate was neutralized with a concentrated aqueous solution of potassium hydroxide, and the precipitate was recrystallized consecutively from ether and ethyl acetate. 2.0 grams of N-betadimethylaminoethyl-12-keto-10,11-dihydroxystearamide, having a melting point of 86–87° C., were obtained.

Calculated for $C_{22}H_{44}O_4N_2$:

| | Percent |
|---|---|
| Carbon | 65.96 |
| Hydrogen | 11.07 |

Found:

| | |
|---|---|
| Carbon | 66.01 |
| Hydrogen | 11.34 |

EXAMPLE IX

N - gamma - diethylaminopropyl - 12 - keto - 10,11 - octadecenoamide 4.11 grams of isobutylchloroformate were added dropwise to a stirred solution of 8.88 grams of 12-keto-10,11-octadecenoic acid and 3.06 grams of triethylamine in solution in 300 ml. of dry toluene, the reaction mixture being maintained at −5 to −10° C. by means of an alcohol-Dry Ice bath. The reaction mixture was stirred and maintained at −5 to −10° C. for thirty minutes after addition had been completed. 3.9 grams of gamma-diethylaminopropylamine were added to the reaction mixture and the reaction mixture was refluxed for five minutes. A precipitate of triethylamine hydrochloride was formed and removed by filtration and the filtrate was evaporated to dryness under reduced pressure. The residue was dissolved in 500 ml. of thrice normal hydrochloric acid and the solution was decolorized with animal charcoal and filtered. The filtrate was neutralized with a concentrated aqueous solution of potassium hydroxide and the precipitate which formed was recrystallized twice from a mixture of equal portions of ether and petroleum ether having a boiling point of 30–60° C. 4.9 grams of N-gamma-diethylaminopropyl-12-keto-10,11 - octadecenoamide, having a melting point of 38–39° C., were obtained.

Calculated for $C_{25}H_{48}O_2N_2$:

| | Percent |
|---|---|
| Carbon | 73.47 |
| Hydrogen | 11.84 |

Found:

| | |
|---|---|
| Carbon | 73.57 |
| Hydrogen | 11.77 |

EXAMPLE X

N - beta - diethylaminoethyl - 12 - keto - 10,11 - octa - decenoamide 2.74 grams of isobutylchloroformate were added to a stirred solution of 5.92 grams of 12-keto-10,11-octadecenoic acid and 2.04 grams of triethylamine in solution in 200 ml. of dry toluene, the reaction mixture being maintained at −5 to −10° C. by means of an alcohol-Dry Ice bath. The reaction mixture was stirred and maintained at −5 to −10° C. for thirty minutes after addition had been completed. 2.32 grams of beta-diethylaminoethylamine were added to the reaction mixture and the reaction mixture was refluxed for five minutes. A precipitate of triethylamine hydrochloride was formed and removed by filtration and the filtrate was evaporated to dryness under reduced pressure. The residue was dissolved in 200 ml. of thrice normal hydrochloric acid, and the solution was heated with animal charcoal and filtered. The filtrate was cooled to 0° C. and made basic with a concentrated aqueous solution of potassium hydroxide. The precipitate which was formed by filtration was recrystallized from 40 percent ethanol. 3.2 grams of N-beta-diethylaminoethyl-12-keto-10,11-octadecenoamide, having a melting point of 42–43° C. were obtained.

Calculated for $C_{24}H_{26}O_2N_2$:

| | Percent |
|---|---|
| Carbon | 73.04 |
| Hydrogen | 11.75 |

Found:

| | |
|---|---|
| Carbon | 72.91 |
| Hydrogen | 11.75 |

EXAMPLE XI

N - beta - diethylaminoethyl - 12 - keto - 10,11 - epoxystearamide 1.37 grams of isobutylchloroformate were added dropwise to a stirred solution of 3.12 grams of 12-keto-10,11-epoxystearic acid and 1.02 grams of triethylamine in solution in 100 ml. of dry toluene, the mixture being maintained at −5 to −10° C. by means of an alcohol-Dry Ice bath. The reaction mixture was stirred and maintained at −5 to −10° C. for thirty minutes after addition had been completed. 1.16 grams of beta-diethylaminoethylamine were added to the reaction mixture and the reaction mixture was refluxed for five minutes. A precipitate of triethylamine hydrochloride was formed and removed by filtration, and the filtrate was evaporated to dryness under reduced pressure. The residue was dissolved in 100 ml. of thrice normal hydrochloric acid and the solution was decolorized with animal charcoal and filtered. The filtrate was neutralized with a concentrated aqueous solution of potassium hydroxide and the precipitate which was formed was recrystallized from ether. 0.6 gram of N-beta-diethylaminoethyl-12-keto-10,11-epoxystearamide, having a melting point of 43 to 44° C. were obtained.

Calculated for $C_{24}H_{46}O_3N_2$:

| | Percent |
|---|---|
| Carbon | 70.19 |
| Hydrogen | 11.29 |

Found:

| | |
|---|---|
| Carbon | 69.92 |
| Hydrogen | 11.21 |

EXAMPLE XII

N - beta - diethylaminoethyl - 10,11 - dihydroxy - 12 - ketostearamide 4.11 grams of isobutylchloroformate were added dropwise to a stirred solution of 9.9 grams of 10,11-dihydroxy-12-ketostearic acid and 3.06 grams of triethylamine in 300 ml. of tetrahydrofuran, the mixture being maintained at a temperature of −5 to −10° C. by means of an alcohol-Dry Ice bath. The reaction mixture was stirred and maintained at −5 to −10° C. for thirty minutes after the addition had been completed. 3.48 grams of beta-diethylaminoethylamine were added to the reaction mixture which was then refluxed for fifteen minutes. A precipitate of triethylamine hydrochloride was formed and removed by filtration and the filtrate was evaporated to dryness under reduced pressure. The residue was dissolved in 500 ml. of thrice normal hydrochloric acid and the solution was decolorized with animal charcoal and filtered. The filtrate was neutralized with a concentrated aqueous solution of potassium hydroxide and the precipitate which formed was recrystallized twice from ether and once from ethyl acetate. 4.4 grams of N-beta-diethylaminoethyl-10,11-dihydroxy-12-ketostearamide, having a melting point of 87–88° C. were obtained.

Calculated for $C_{24}H_{48}O_4N_2$:

| | Percent |
|---|---|
| Carbon | 67.25 |
| Hydrogen | 11.29 |

Found:

| | |
|---|---|
| Carbon | 67.09 |
| Hydrogen | 11.21 |

EXAMPLE XIII

N - delta - diethylamino - alpha - methylbutyl - 12 - keto-10,11-octadecenoamide 4.11 grams of isobutylchloroformate were added dropwise to a stirred solution of 8.88 grams of 12-keto-10,11-octadecenoic acid and 3.06 grams of triethylamine in solution in 300 ml. of dry toluene, the mixture being maintained at −5 to −10° C. by means of an alcohol-Dry Ice bath. The reaction mixture was stirred and maintained at −5 to −10° C. for thirty minutes after addition had been completed. 4.74 grams of 4-diethylamino-2-aminopentane were added to the reaction mixture and the reaction mixture was refluxed for five minutes. A precipitate of triethylamine hydrochloride was formed and removed by filtration and the filtrate was evaporated to dryness under reduced pressure. The residue was dissolved in 800 ml. of thrice normal hydrochloric acid and the solution was decolorized with animal charcoal and filtered. The filtrate was neutralized with a concentrated aqueous solution of potassium hydroxide and the precipitate which formed was recrystalized from a mixture of equal portions of ether and petroleum ether having a boiling point of 30 to 60° C. 5.2 grams of N-delta-diethylamino-alpha-methylbutyl-12-keto-10,11-octadecenoamide, having a melting point of 36° C., were obtained.

Calculated for $C_{27}H_{52}O_2N_2$:  Percent
Carbon ———————————————— 74.25
Hydrogen ——————————————— 12.00
Found:
Carbon ———————————————— 73.73
Hydrogen ——————————————— 12.08

EXAMPLE XIV

N - gamma - diethylaminopropyl - 12 - keto - 10,11-epoxystearamide 4.11 grams of isobutylchloroformate were added dropwise to a stirred solution of 9.36 grams of 12-keto-10,11-epoxystearic acid and 3.06 grams of triethylamine in solution in 300 ml. of dry toluene, the mixture being maintained at −5 to −10° C. by means of an alcohol-Dry Ice bath. The reaction mixture was stirred and maintained at −5 to −10° C. for thirty minutes after addition had been completed. 3.9 grams of gamma-diethylaminopropylamine were added to the reaction mixture and the reaction mixture was refluxed for five minutes. A precipitate of triethylamine hydrochloride was formed and removed by filtration and the filtrate was evaporated to dryness under reduced pressure. The residue was dissolved in 500 ml. of thrice normal hydrochloric acid and the solution was decolorized with animal charcoal and filtered. The filtrate was neutralized with a concentrated aqueous solution of potassium hydroxide and after cooling, the precipitate which formed was recrystallized twice from a mixture of equal portions of ether and petroleum ether having a boiling point of 30–60° C. 6.2 grams of N-gamma-diethylaminopropyl-12-keto-10,11-epoxystearamide, having a melting point of 44–45° C. were obtained.

Calculated for $C_{25}H_{48}O_3N_2$:  Percent
Carbon ———————————————— 70.71
Hydrogen ——————————————— 11.39
Found:
Carbon ———————————————— 70.50
Hydrogen ——————————————— 11.30

The novel compounds of this invention are highly effective at low concentration in killing microorganisms or preventing or inhibiting their growth.

EXAMPLE XV

The novel compounds of this invention were tested for bactericidal activity by the following serial dilution method.

The compounds to be tested were sterilized by exposure to propylene oxide for three days and 0.5 ml. of sterile aqueous solution containing 20 micrograms of compound per ml. of solution was added to 9.5 ml. of sterile yeast beef broth, the broth then being serially diluted with additional sterile broth to provide solutions of five ml. total volume containing 100, 50, 10, 1, 0.1, and 0.01 micrograms of compound per ml. of solution. Three tubes each containing 4.5 ml. of sterile broth, were inoculated with 0.1 ml. of a mature broth culture of *Bacillus subtilis, Diplococcus pneumoniae III,* and *Micrococcus pyogenes* var. *aureus,* respectively, and the inoculated tubes were incubated at 37° C. for 24 hours. Three tubes, each containing 4.5 ml. of sterile broth, were each inoculated with 0.1 ml. of an incubated culture and incubated at 37° C. for 24 hours. Progressive series of dilutions ranging from 1 to 100, to 1 to 1 billion, were prepared by dilution of the contents of the three tubes with sterile broth and 0.1 ml. of each dilution was transferred into 4.5 ml. of sterile broth and incubated at 37° C. for 24 hours. 0.1 ml. of the contents of the tubes representing the highest dilution which initiated growth of the organism were each transferred into each of the tubes containing the compounds to be tested, and this was followed by incubation of the tubes at 37° C. for 48 hours. The table below gives the results of the tests by serial dilution in column I, the values being the concentrations in micrograms per milliliter at which growth was inhibited.

The novel compounds of this invention were tested for activity against *Mycobacteria tuberculosis* H37Rv according to the method of A. W. Frisch and M. S. Tarshis, American Review of Tuberculosis, vol. 64, page 551 (1951). The table below gives the results of the activity of the novel compounds against *Mycobacteria tuberculosis* H37Rv in column II, inhibiting concentrations being expressed in micrograms per milliliter.

N-beta-dimethylaminoethyl-12-ketoelaidamide and N-beta-dimethylaminoethyl-12-ketooleamide were tested for activity against *Coccidioides immitis* by a serial dilution method given by the following procedure:

The compounds were sterilized by exposure to propylene oxide for three days and 0.25 ml. of sterile aqueous solution containing twenty micrograms of compound per ml. of solution was added to 4.5 ml. of sterile Mycophil broth, the broth then being serially diluted with additional sterile broth to provide solutions of five ml. total volume containing 500, 100, 10, 1, 0.1, and 0.01 micrograms of compound per ml. of solution. One ml. of a seventy-two hour Mycophil broth culture of *Coccidioides immitis* was added to ninety-nine ml. of sterile Mycophil broth and 0.2 ml. of diluted culture was added to each of the serial dilutions containing the test compound and the inoculated tubes were incubated at 25° C. for five days. The table below gives the results of the tests in column III, inhibiting concentrations being expressed in micrograms per milliliter.

The novel compounds of this invention were tested for activity against *Candida albicans* by a serial dilution method given by the following procedure:

The compounds to be tested were sterilized by exposure to propylene oxide for three days and 0.25 ml. of sterile aqueous solution containing twenty micrograms of compound per ml. of solution was added to 4.5 ml. of sterile Mycophil broth, the broth then being serially diluted with additional sterile broth to provide solutions of five ml. total volume containing 500, 100, 10, 1, 0.1, and 0.01 micrograms of compound per ml. of solution. One ml. of a seventy-two hour Mycophil broth culture of *Candida albicans* was added to ninety-nine ml. of sterile Mycophil broth and 0.2 ml. of diluted culture was added to each of the serial dilutions containing the test compound and the inoculated tubes were incubated at 25° C. for five days. The table below gives the results of the tests in column IV, inhibiting concentrations being expressed in micrograms per milliliter.

TABLE

| | Column I — Bacterial Inhibiting Activity | | | | Column II — Mycobacterial Inhibiting Concentration | Column III — Fungal Inhibiting Concentration | Column IV — Fungal Inhibiting Concentration |
|---|---|---|---|---|---|---|---|
| | B. Subtilis | D. Pneumoniae III | M. Pyogenes var. aureus | Ps. aeruginosa | Mycobacterium Tuberculosis H37Rv | Coccidioides Immitis | Candida Albicans |
| N-Beta-dimethylaminoethyl-12-ketoelaidamide | | | | | 100 | 10 | |
| N-Beta-dimethylaminoethyl-12-ketooleamide | 10 | 1 | 10 | 50 | 100 | 10 | |
| N-Gamma-diethylaminopropyl-12-keto-10,11-octadecenoamide | 50 | 10 | 10 | | 10 | | 10 |
| N-Beta-diethylaminoethyl-12-keto-10,11-octadecenoamide | 50 | 50 | 50 | | | | 100 |
| N-Beta-diethylaminoethyl-10,11-dihydroxy-12-ketostearamide | 100–200 | 50–100 | 10–50 | | | | 500 |
| N-Delta-diethylamino-alpha-methylbutyl-12-keto-10,11-octadecenoamide | 50 | 50 | 50 | | 100 | | 100 |
| N-Gamma-diethylaminopropyl-12-keto-10,11-epoxystearamide | 50 | 50 | 100 | | 100 | | 500 |

What is claimed is:

1. New and useful compounds having the general structural formula:

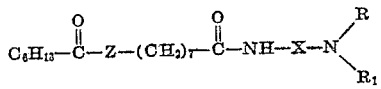

wherein Z is a radical selected from the group consisting of:

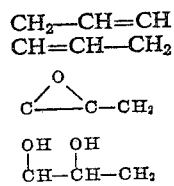

and
X is a lower alkylene radical, and R and $R_1$ are each a lower alkyl radical.

2. N-beta-diethylaminoethyl-12-ketoelaidamide.
3. N-beta-dimethylaminoethyl-12-ketoelaidamide.
4. N - gamma - diethylaminopropyl - 12 - ketoelaidamide.
5. N-gamma-dimethylaminopropyl-12-ketooleamide.
6. N-beta-dimethylaminoethyl-12-ketooleamide.
7. N - beta - dimethylaminoethyl - 12 - keto - 10,11-octadecenoamide.
8. N - gamma - dimethylaminopropyl - 12 - keto-10,11-epoxystearamide.
9. N - beta - dimethylaminoethyl - 12 - keto - 10,11-dihydroxystearamide.
10. N - gamma - diethylaminopropyl - 12 - keto-10,11-octadecenoamide.
11. N - beta - diethylaminoethyl - 12 - keto - 10,11-octadecenoamide.

References Cited in the file of this patent

UNITED STATES PATENTS

| | | |
|---|---|---|
| 2,822,369 | Nichols et al. | Feb. 4, 1958 |
| 2,842,560 | Nichols et al. | July 8, 1958 |